United States Patent [19]

Pisharody et al.

[11] Patent Number: 4,780,779
[45] Date of Patent: Oct. 25, 1988

[54] LAMINATED SENDUST METAL-IN-GAP VIDEO HEAD

[75] Inventors: Raghavan K. Pisharody, Palo Alto; Robert H. Ohe, Sunnyvale, both of Calif.

[73] Assignee: Ampex Corporation, Redwood City, Calif.

[21] Appl. No.: 122,972

[22] Filed: Nov. 19, 1987

[51] Int. Cl.[4] .................. G11B 5/235; G11B 5/147
[52] U.S. Cl. ..................................... 360/120; 360/126
[58] Field of Search .................. 360/120, 126, 122; 29/603

[56] References Cited
FOREIGN PATENT DOCUMENTS 0206658 12/1986 European Pat. Off. ............ 360/126

Primary Examiner—A. J. Heinz
Attorney, Agent, or Firm—Harry G. Thibault; Richard P. Lange; Joel D. Talcott

[57] ABSTRACT

An improved magnetic head structure which places a laminate at the gaps of the head, said laminate deposited on each substrate facing the gap, and comprising alternating layers of first and second magnetic materials, said first material having a higher coercivity than said second material.

7 Claims, 1 Drawing Sheet

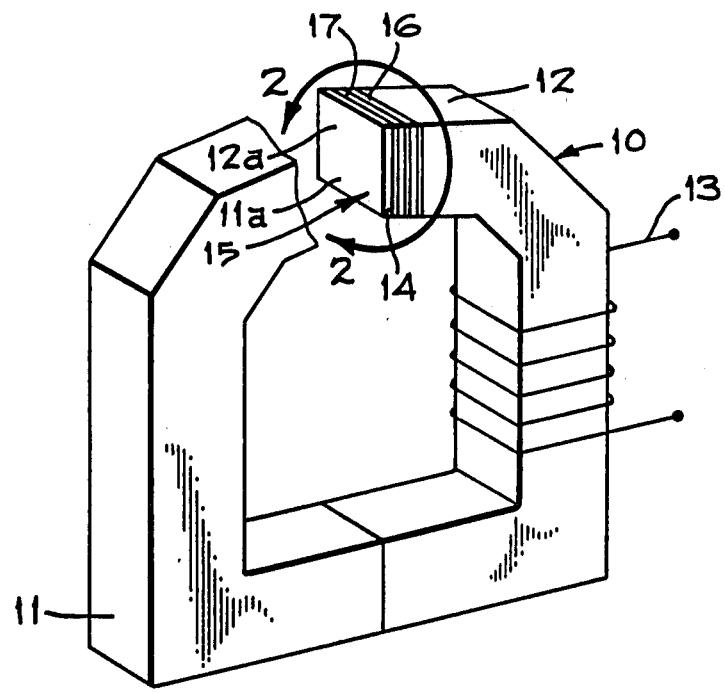
FIG_1
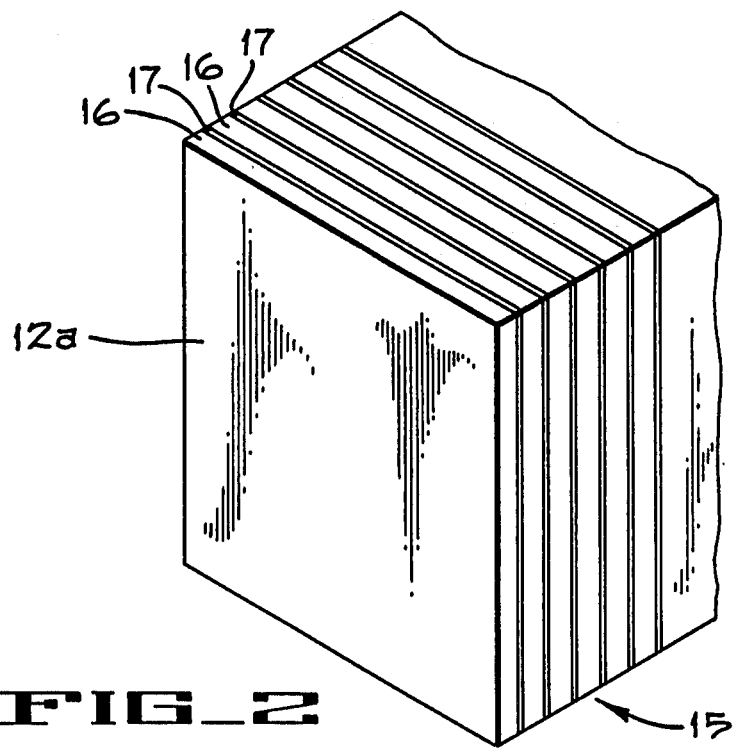
FIG_2

LAMINATED SENDUST METAL-IN-GAP VIDEO HEAD

The present invention relates to magnetic heads improved in electromagnetic characteristics and abrasion resistance. More particularly, the present invention relates to an improved magnetic head having a thin film laminate structure at the head gap, such structure having lower coercivity and improved abrasion characteristics.

In one configuration, a ferrite head forms a horseshoe shaped magnetic core structure closed at the upper end of opposite arms except for a small gap. A variable flux current is generated in the core to produce a variable magnetic field across such gap. Magnetic tape is then moved across the gap for reading/ writing thereon and/or erasure. However simple ferrite heads are not suitable for higher coercivity tape, particularly when there is a relatively narrow gap in the head because the ferrite core is easily saturated.

To overcome the problem, a material of low coercivity but also high in saturation properties has been bonded to the head on the opposite faces confronting the gap. However, the two main categories of materials used pose substantially different problems. A magnetic iron-nickel alloy of relatively low coercivity, generally known as permalloy, is readily bonded to the ferrite without special processing. However, permalloy is very soft and poses substantial wear problems when bonded to the ferrite head on opposing faces of the gap. A relatively hard electromagnetic material known as Sendust possesses a higher than desired coercivity when bonded at the faces of the core opposing the gap but can be thermally annealed to reduce the coercivity of the Sendust to the desired level.

Moreover, even when Sendust is used with other materials, such as in a configuration in which alternating layers of Sendust and a nonmagnetic material is used, the nonmagnetic material used to minimize any eddy current losses in the magnetic material, the composite head must again be annealed to reduce the coercivity of the Sendust material at the head gap. However, the annealing process for the Sendust film provided on the opposing faces of the ferrite core at the gap poses special problems. The coercivity of the Sendust film sputtered at the gap depends on a multiplicity of such complex sputering parameters as argon or vacuum pressure, substrate surface conditions, temperature and related parameters. Also, the bonding of magnetic and non-magnetic materials in alternating layers typically will produce separate gaps therebetween which are undesirable. Thus it would be highly desirable to obtain a lower coercivity Sendust film without the above processing problems.

It should be noted that whether a solid Sendust block, or a permalloy member, or any of the laminate structures noted above are provided on opposite faces at the gap, or there is simply a ferrite-ferrite gap, the coercivity of each of the finished materials at the gap is roughly the same magnitude, (about 1.0 oersteds).

The most advantageous structure is a Sendust structure because of its higher saturation levels and its hardness, if that Sendust structure did not require annealing and the complexities associated therewith. The ferrite-ferrite gap is readily saturated, the permalloy-permalloy gap is readily worn away, and each of the known SendustSendust gaps is produced by an undesirable and complex annealing process, no matter what other form they take. Therefore, it would be desirable to use the Sendust material in a form which would eliminate the annealing process and yet provide a low coercivity, high saturability, long wearing interface at the gap of the head core.

In accordance with the present invention it has been found that a laminated structure of alternating Sendust and permalloy films, having five or more layers, each Sendust layer being five to ten microinches thick, and separated by a layer, one to five microinches thick of permalloy or another soft magnetic material, results in a structure having a coercivity and permeability comparable to a ferrite-ferrite interface, but with much more desirable saturation properties. Moreover, such lower coercivity films can be made without thermal annealing, with its stringent sputtering and annealing parameters. The hardness of the film at the head gap will be comparable to an annealed thick single film Sendust head and can be used for video record/reproduce and erase.

Alternating layers of permalloy and Sendust are sputtered on ferrite core surfaces. When the sputtering process is complete, the ferrite cores are then bonded together to permit the construction and processing of video heads.

BRIEF DESCRIPTION OF THE DRAWINGS

FIG. 1 is a perspective view of a head element adapted for use in the present invention and including a core winding around the core;

FIG. 2 is a detail taken from the circle 2—2 shown in FIG. 1 and enlarged for clarity;

The head or head core 10 shown in FIG. 1 comprises opposite core halves 11, 12, the core half 12 having wound thereon a coil 13 provided to generate a variable magnetic flux in the head core 10 through the application of a variable current input to the coil 13. A gap 14 provided at the interface of the core halves 11 and 12 includes opposite faces 11a, 12a to each of which a laminate structure 15 is bonded. The head core 10 is formed of a ferrite material having a relatively low coercivity. However such ferrite material can be readily saturated by today's higher coercivity tapes and particularly when the gap 14 in the head core 10 is relatively narrow. Consequently, it is desirable to place a head gap material of relatively low coercivity and substantially more saturable than the ferrite head core 10 at the gap 14. Moreover, that material should be relatively hard to reduce wear at the gap 14 in the head core 10.

In the present invention the metal at the gap 14 comprises successive layers 16 of a magnetic alloy of high coercivity, such as Sendust, each layer of such alloy having a thickness of 5 to 10 microinches and alternating with layers 17 of permalloy (NiFe) or some other soft magnetic material, each permalloy or other soft magnetic material layer having a thickness of 1 to 5 microinches. It is desirable to place at least five such layers 16, 17 on each of opposite faces 11a, 12a of the ferrite head core 10 at the gap 14. Such materials so provided produce the desired characteristics of hardness, saturability and coercivity at the gap 14.

Furthermore, there is no requirement for annealing such a layered head core structure 10 as would be required if a single hardened layer of Sendust were provided at the gap 14 of a thickness similar to the thickness of the laminate 15. Such a solid Sendust piece would require annealing in a specified atmosphere, at a specified pressure, with specific substrate surface preparation and with specific time requirements. The annealing process, with specific and rigorous requirements is thus eliminated with no sacrifice in the desired electromagnetic parameters for the head core 10.

Such improved results are achieved because the higher coercivity of relatively thick Sendust films is due to columnar growth of the film and higher anisotrophy. Columnar growth can be reduced by using the thinner films as outlined here. By using relatively thin permalloy layers, the Sendust layers remain magnetically coupled. Because of magnetic coupling between the layers, the whole film acts as a single member. If the magnetic coupling between the Sendust layers is weak, each Sendust layer is independent and the magnetic properties of such structure vary from layer to layer and thus such structure is not desirable. Those structures which use insulating materials between successive layers of magnetic material to isolate each layer to reduce eddy current losses between those layers operate at cross purposes to the proposed structure and therefore are not pertinent to the present invention.

Having described a preferred embodiment of this invention, many modifications and variations are possible in the light of the specification as described. It is therefore to be understood that the invention may be practiced other than as specifically described above within the scope of the appended claims.

What is claimed is:

1. A magnetic head assembly comprising a pair of opposite core members, said core members each having pole pieces at opposite ends, at least one pair of confronting pole pieces arranged to face a gap between said core members, each of said confronting pole pieces providing a substrate for receiving successive layers of a laminated material, said laminated material comprising alternating layers of at least first and second magnetic materials, said first magnetic material of a higher coercivity than the second magnetic material, each layer of the first magnetic material having a thickness ranging from 5 to 10 microinches, and each alternating layer of the second magnetic material having a thickness ranging from 1 to 5 microinches.

2. A magnetic head assembly as claimed in claim 1 wherein the laminated material at each substrate comprises at least five alternating layers of said first and second magnetic materials.

3. A magnetic head assembly as claimed in claim 2 wherein the first magnetic material is Sendust.

4. A magnetic head assmmbly as claimed in claim 3 wherein the second magnetic material is permalloy.

5. A method of providing a head structure on a magnetic head assembly comprising a pair of opposite core members, said core members each having pole pieces at opposite ends, at least one pair of confronting pole pieces arranged to face a gap between said core members, each of said confronting pole pieces providing a substrate for receiving successive layers of a laminated material, said method comprising the steps of:

applying a first magnetic material of a relatively high coercivity to the substrate to a thickness ranging from 5 to 10 microinches;

applying a second layer of a second magnetic material of relatively lower coercivity than the first material to the first layer of said first magnetic material on the substrate, said second material having a thickness ranging from 1 to 5 microinches; and applying alternating layers of said first and second material to each substrate to a thickness of at least five layers.

6. A method of providing a head structure on a magnetic head assembly as claimed in claim 5 wherein in the step of applying the first magnetic material, Sendust is applied to the substrate.

7. A method of providing a head structure on a magnetic head assembly as claimed in claim 6 wherein in the step of applying the second magnetic material, permalloy is applied to the Sendust layer on the substrate.

* * * * *